United States Patent
Lambert et al.

(10) Patent No.: US 11,878,544 B2
(45) Date of Patent: Jan. 23, 2024

(54) SECURITY ELEMENT, ELECTRONIC CARD, ELECTRONIC PAYMENT TERMINAL AND CORRESPONDING ASSEMBLY METHOD

(71) Applicant: Banks and Acquirers International Holding, Suresnes (FR)

(72) Inventors: Xavier Lambert, Rueil Malmaison (FR); Bertrand Dajon-Lamare, Grosrouvre (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 0 days.

(21) Appl. No.: 17/795,715

(22) PCT Filed: Jan. 28, 2021

(86) PCT No.: PCT/EP2021/051934
§ 371 (c)(1),
(2) Date: Jul. 27, 2022

(87) PCT Pub. No.: WO2021/151981
PCT Pub. Date: Aug. 5, 2021

(65) Prior Publication Data
US 2023/0067044 A1 Mar. 2, 2023

(30) Foreign Application Priority Data
Jan. 31, 2020 (FR) ...................... 2001003

(51) Int. Cl.
*G06F 21/87* (2013.01)
*B42D 25/47* (2014.01)
(Continued)

(52) U.S. Cl.
CPC ............. *B42D 25/47* (2014.10); *B42D 25/30* (2014.10); *B42D 25/455* (2014.10)

(58) Field of Classification Search
CPC ...................................................... G06F 21/87
(Continued)

(56) References Cited

U.S. PATENT DOCUMENTS

| 5,242,096 A | * | 9/1993 | Tsunabuchi | ............ | B23K 1/008 228/43 |
| 6,046,907 A | * | 4/2000 | Yamaguchi | ............ | H01L 23/433 428/36.2 |
| 6,048,082 A | * | 4/2000 | Washimoto | ............ | F21V 19/002 362/255 |

FOREIGN PATENT DOCUMENTS

| EP | 2569736 A1 | 3/2013 |
| JP | 2006139952 A | 6/2006 |

(Continued)

OTHER PUBLICATIONS

English translation of the Written Opinion of the International Searching Authority dated Apr. 28, 2021 for corresponding International Application No. PCT/EP2021/051934, filed Jan. 28, 2021.

(Continued)

*Primary Examiner* — Paultep Savusdiphol
(74) *Attorney, Agent, or Firm* — David D. Brush; Westman, Champlin & Koehler, P.A.

(57) ABSTRACT

A security element, called a security dome, intended to be glued onto an electronic board. The security element includes at least: a metal part intended to be in contact with at least one electrical circuit of the electronic board; and a protective part covering the metal part and having a first face comprising an adhesive portion intended to ensure the gluing of the security element on the electronic board by an automatic assembly method having at least one reflow step. The metal part and protective part are resistant to temperatures used during the reflow step.

8 Claims, 3 Drawing Sheets

(51) Int. Cl.
B42D 25/30 (2014.01)
B42D 25/455 (2014.01)

(58) Field of Classification Search
USPC .......................................... 235/492
See application file for complete search history.

(56) References Cited

FOREIGN PATENT DOCUMENTS

| JP | 2015170492 A | 9/2015 |
| WO | 2011141232 A1 | 11/2011 |
| WO | 2013187516 A1 | 12/2013 |

OTHER PUBLICATIONS

International Search Report dated Apr. 19, 2021 for corresponding International Application No. PCT/EP2021/051934, filed Jan. 28, 2021.
Written Opinion of the International Searching Authority dated Apr. 19, 2021 for corresponding International Application No. PCT/EP2021/051934, filed Jan. 28, 2021.
French Search Report and Written Opinion with English machine translation dated Oct. 12, 2020 for corresponding French Application No. 2001003, filed Jan. 31, 2020.

\* cited by examiner

[Fig. 1a]
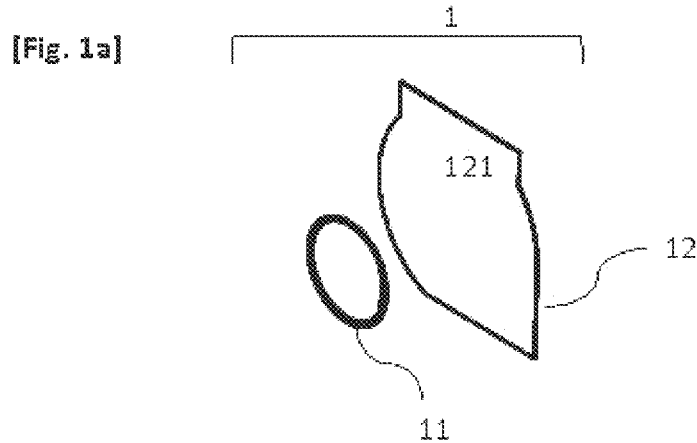
[Fig. 1b]
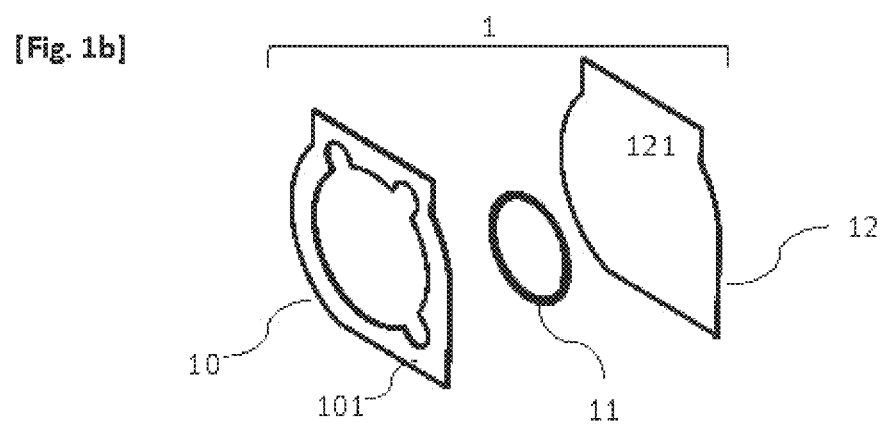

[Fig. 1c]
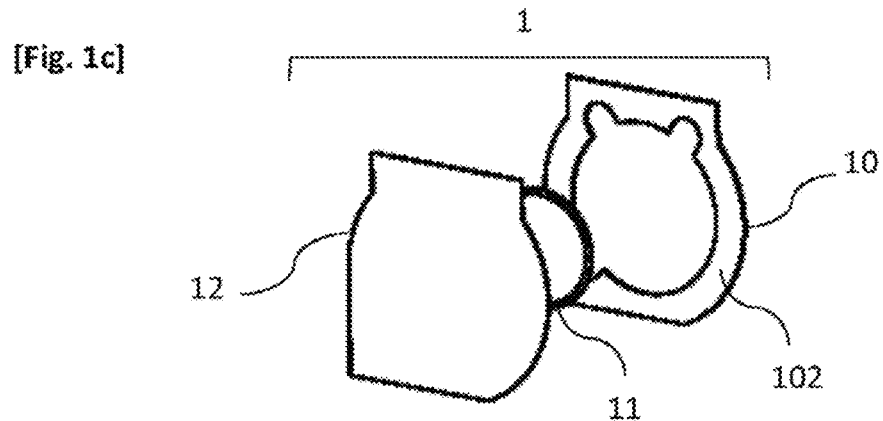
[Fig. 2]
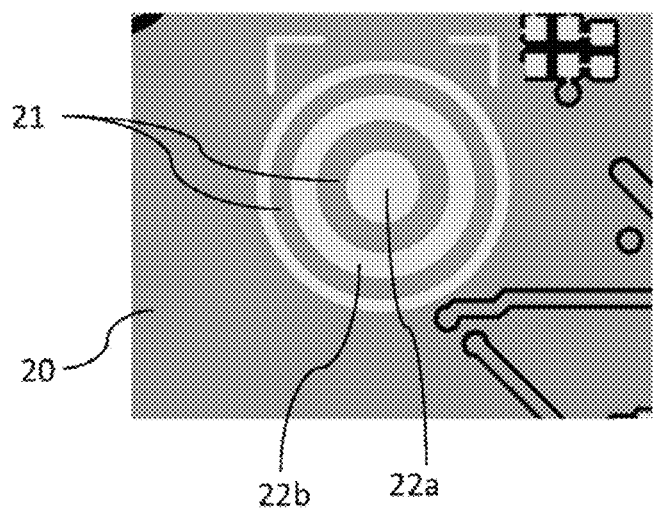

[Fig. 3]
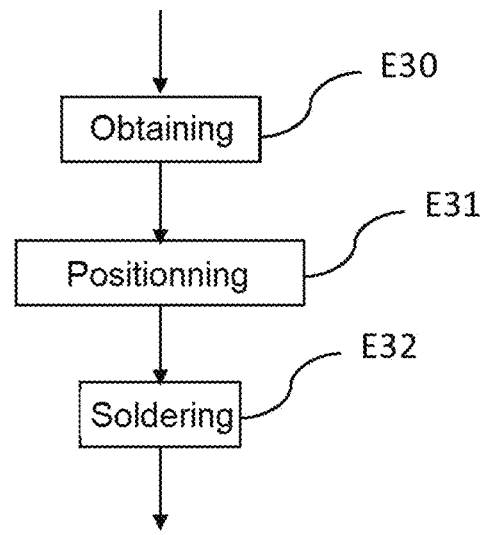

SECURITY ELEMENT, ELECTRONIC CARD, ELECTRONIC PAYMENT TERMINAL AND CORRESPONDING ASSEMBLY METHOD

CROSS-REFERENCE TO RELATED APPLICATIONS

This Application is a Section 371 National Stage Application of International Application No. PCT/EP2021/051934, filed Jan. 28, 2021, which is incorporated by reference in its entirety and published as WO 2021/151981 A1 on Aug. 5, 2021, not in English.

FIELD OF THE INVENTION

The field of the invention is that of electronic devices comprising at least one electronic board on which electronic components are implanted.

More specifically, the invention relates to securing and improving the performance of such an electronic board.

The use of such electronic boards is widespread in the industry. Moreover, many fields require high levels of security in terms of confidentiality of the electrical signals passing through the equipment. The invention thus has many applications, in particular, but not exclusively, in the fields of electronic payment terminals, payment card readers, etc.

PRIOR ART AND ITS DISADVANTAGES

Focus is more particularly given in the remainder of this document to describing an existing problem in the field of electronic payment terminals with which the inventors of the present patent application have been confronted, relating to the particular components that are security domes conventionally used in electronic payment terminals.

These specific components are implemented in particular with the aim of detecting an intrusion within an electronic payment terminal, within the more global framework of a system for securing such a device. Thus, a security dome is positioned at a strategic location of an electronic board in an electronic payment terminal, so as to close an electrical circuit when the case of the electronic payment terminal is closed, due to a constraint which applies to the security dome. Thus, when the electronic payment terminal undergoes an opening or intrusion attempt, the security dome is "freed" from this constraint and opens the electrical circuit, which is connected to an intrusion detection module then triggering actions to secure the electronic payment terminal (such as, for example, erasing all sensitive data, setting the electronic payment terminal to error, . . . ).

To date, there are two main techniques for installing/implanting these security domes on an electronic board: gluing and soldering (or welding).

According to the first technique, the security domes are glued onto an electronic board, manually, by an operator, after the installation and soldering of the other components of the electronic board. Such security domes are conventionally composed of several elements, including a metal part to ensure the electrical connection and one or more adhesive parts allowing the dome to be laid by gluing and the protection of the metal part.

This technique of laying by gluing generates difficulties of precision in the positioning of the security domes on the electronic board and can then generate problems during the operation of the electronic payment terminal, for example by the detection of false intrusion if one or more domes are poorly positioned in their security zone. Indeed, positioning a security dome not only requires very high precision, but can also be delicate depending on the location on the electronic board. Indeed, the components already positioned (by soldering) on the electronic board can either obscure the location of the dome or interfere with its positioning. Finally, this manual technique has disadvantages in terms of laying performance, this performance being directly related to the ability of the operator to perform this operation. This technique of laying by gluing can therefore generate low productivity and thus increase the manufacturing costs of the electronic boards on which security domes are implanted.

According to the second technique, the security domes are automatically welded onto an electronic board.

The main disadvantage of this technique lies in the problems of reliability in use, due to the fact that the soldering/welding is continuously urged by the mechanical stress, or the constraint, undergone by the security dome. Moreover, the brazed joint not being reproducible in its shape, it is difficult to define rules of reliability of installation and use according to this technique.

There is therefore a need for a technique for installing security domes on an electronic board that allows optimal reliability of installation and optimal reliability in use.

DISCLOSURE OF INVENTION

This technique proposes a security element, called a security dome, intended to be glued onto an electronic board, the security element comprising at least:
- a metal part intended to be in contact with at least one electrical circuit of the electronic board;
- a protective part covering the metal part and having a first face comprising an adhesive portion intended to ensure the gluing of the security element on the electronic board by an automatic assembly method comprising at least one reflow step,
- said metal part and protective part being resistant to the temperatures used during said reflow step.

Thus, the present technique proposes a new and inventive solution to improve the performance of security domes implanted on an electronic board, by allowing their implantation by gluing and automatically during the assembly method used to assemble components called "SMD" components, comprising a reflow soldering step, on the electronic board.

The desired technical effects are obtained on the one hand thanks to the automatic placement of such security domes, allowing to obtain optimum reliability and efficiency in terms of assembly, compared to manual installation, and on the other hand thanks to the choice of materials for the manufacture of the domes which allow the use of a gluing technique resistant to reflow temperatures and thus to obtain great robustness over time, compared to a welding technique.

For this purpose, such a security dome comprises in particular a metal part allowing to ensure the actual security function of the dome, as well as a protective part, covering the metal part, and allowing the gluing of the dome on the electronic board, directly or via another part of the dome, according to different embodiments. The manufacturing materials of these metal and protective parts are therefore chosen to have features of resistance to the reflow temperatures used during the assembly method.

According to one embodiment, the security element also comprises a first part, called a spacer, having:

a first face comprising an adhesive portion intended to be glued onto the electronic board by an automatic assembly method comprising at least one reflow step, a second face onto which the adhesive portion of the first face of the protective part is glued, the first part being resistant to the temperatures used during the reflow step.

Thus, according to this embodiment, the security dome, consisting of a metal part to ensure electrical conductivity, and of a protective part covering the metal part, also comprises an adhesive part (spacer) allowing to ensure its gluing on the electronic board. This spacer has the same temperature resistance features as the other two parts. This spacer also allows to obtain a "pre-assembled" dome, comprising the three parts, which can be positioned on a support in order to be integrated into the automatic assembly method.

The security dome according to the present technique is therefore adapted for implantation by gluing during an automatic method for assembling components on an electronic board comprising a reflow step.

According to a particular aspect, the first part has a hollow central portion and the metal part is movable relative to the first part and the protective part.

Thus, according to this embodiment, the security dome consists of a spacer with an adhesive face intended for gluing to the electronic board and a hollow central part allowing a metal part, the dome itself, to be in contact with an electrical circuit of the electronic board, as well as a third protective part. This third part corresponds for example to a plastic film also having an adhesive face allowing it to be fixed on the other face of the spacer and thus to "enclose" the metal dome, which is free to move, between the electronic board and the protective film.

Such an assembly of these three parts of the security dome allows to obtain a reliable and efficient security element, in terms of precision of installation by gluing on the electronic board and in terms of securing the electronic device wherein the electronic board is installed, the mobility of the metal part allowing in particular a better robustness of use.

According to a particular feature, the security element is composed of temperature-resistant materials belonging to the group comprising:

Polyimides;
Liquid-crystal polymers;
Silicones;
Polyepoxides
Acrylic.

Thus, the proposed solution is based on a choice of temperature-resistant materials, for each of the parts forming a security dome, allowing it to be glued onto an electronic board during a conventional automatic method for assembling components on the electronic board, comprising in particular a reflow soldering step.

The present technique also relates to an electronic board comprising at least one security element as described previously, according to the various embodiments.

The present technique moreover relates to an electronic payment terminal comprising at least one electronic board as described previously, according to the different embodiments.

The present technique also relates to a method for automatically assembling at least one security element as described above, according to the different embodiments, on an electronic board.

According to the present technique, the method comprises the following automatic steps:

Obtaining said at least one security dome;

Positioning said at least one security dome by gluing said adhesive portion of said first face of said first part or said adhesive portion of said first face of said protective part on said electronic board at a predetermined location;

Reflow soldering of said electronic board.

Thus, the present technique also relates to a method for assembling one or more security domes on an electronic board, automatically and by gluing, allowing to obtain the desired technical effects in terms of reliability, precision and performance of implanting and robustness in use.

For this purpose, the gluing of the security domes is integrated into the reflow method during which the components called "SMD" components to be welded to the electronic board are soldered, this gluing being possible thanks to the specificities of the materials composing the dome, chosen for their resistance to the temperatures used during reflow.

According to a particular aspect, the assembly method also comprises the following two steps, prior to the reflow soldering step:

screen-printing the electronic board;
placing electronic components to be soldered, and the obtaining step consists in removing, by suction, said at least one security dome previously positioned on a support.

The various embodiments mentioned above can be combined with each other for the implementation of the proposed technique.

LIST OF FIGURES

Other purposes, features and advantages of the invention will appear more clearly upon reading the following description, given by way of a simple illustrative and non-limiting example, in relation to the figures, among which:

FIG. 1a illustrates an exploded bottom view of a security dome, according to one embodiment of the invention;

FIG. 1b illustrates an exploded top view of a security dome, according to a second embodiment of the invention;

FIG. 1c illustrates an exploded top view of the security dome illustrated in FIG. 1b, according to a second embodiment of the invention;

FIG. 2 illustrates an example of location of positioning a security dome on an electronic board according to an embodiment of the invention; and FIG. 3 illustrates the main steps of an automatic method for assembling an electronic board comprising the positioning of at least one security dome as illustrated in FIG. 1a, according to an embodiment of the invention.

DETAILED DESCRIPTION OF EMBODIMENTS OF THE INVENTION

As indicated above, the inventors of the present patent application have sought to overcome various technical problems, related to various methods for installing security elements, or security domes, on an electronic board.

Thus, the well-known welding technique has the main disadvantage of poor robustness in use, due in particular to the high constraints and movements undergone by the domes welded to an electronic board, itself integrated into an electronic device such as an electronic payment terminal for example. This problem of robustness not being, or only slightly, observed with domes glued manually onto an electronic board, the inventors therefore favoured a technique of installation by gluing the domes on an electronic board.

However, the current manual laying techniques by gluing domes have the two main disadvantages of low implantation precision and low laying performance. The inventors have therefore sought to integrate a technique of laying by gluing into the existing automatic method for assembling components on an electronic board using soldering (for example reflow soldering). Such an assembly method is used in particular for assembling surface-mounted components, known as "SMD" (for "Surface Mounted Device"). During such an SMD assembly method, the electronic boards go through an oven, during a reflow step, to solder the components previously positioned at predetermined locations on the electronic boards. The reflow is for example used for electronic boards including only SMD type components, or including only SMD type components whose soldering can only be done by this technique, such as "ball grid array" or BGA type components. The installation of SMD components on an electronic board is preferred because it is fast, simple and reliable compared to components called "through" components which require the drilling of the electronic board for their installation.

The inventors have however come up against other problems related to the use of a technique for laying by gluing during a brazing method, namely the temperature resistance of the domes during the reflow soldering step of the method for assembling and the maintaining of the positioning of the dome on its support (for example a reel, a ribbon, a film) before placing it on the electronic board. Indeed, if the domes are shifted on their support before placement, their positioning on the electronic board may be imprecise, causing problems with the reliability of their security function. In order to overcome these difficulties, the proposed technique is based on a modification of the security dome to be able to integrate its installation automatically in a method for assembling the other components on the electronic board. Indeed, machines for laying the components allow to place components on electronic boards in an optimised, fast and precise manner.

The general principle of the invention is therefore based on the modification of the materials which compose the security domes themselves, so that they withstand the temperature profile observed during the soldering step(s) and so that they can thus be placed during the automatic method for assembling the components of an electronic board (for example an SMD assembly method).

An embodiment of the proposed technique will now be described in relation to the figures FIG. 1a to FIG. 3.

FIG. 1a illustrates an exploded bottom view of an example of security dome 1, according to a first embodiment, wherein the security dome 1 comprises a metal part 11 intended to be in contact with at least one electrical circuit of the electronic board (not shown in FIG. 1a). The security dome 1 also comprises a protective part 12 covering the metal part 11 and having a first face 121 comprising an adhesive portion intended to ensure the gluing of the dome to the electronic board by an automatic assembly method comprising at least one reflow step.

For example, according to this first embodiment, the adhesive portion of the first face 121 of the protective part 12 is intended to be glued directly onto the electronic board, thus allowing the security dome 1 to be glued, the metal part 11 being "enclosed" between the board and the protective part 12.

According to the second embodiment described below, the adhesive portion of the first face 121 of the protective part 12 is intended to be glued onto another part of the dome, called a spacer, itself glued directly onto the electronic board.

Moreover, according to this embodiment, the two parts 11 and 12 are resistant to the temperatures used during the reflow step implemented to assemble the security dome 1 on an electronic board. For this purpose, the materials chosen for these parts 11 and 12 must be compatible with the temperatures used during a reflow step, while ensuring the functions necessary for the use of a security dome, that is to say in particular the mechanical robustness and the dimensions required for such a dome. Indeed, these security elements are implanted on electronic boards comprising a large number of components and at strategic locations on the board, sometimes requiring relatively small sizes of these security elements. These features are described below in more detail, in relation to the second embodiment.

FIG. 1b illustrates an exploded bottom view of an example of security dome 1. According to this second embodiment of the invention, such a security dome 1 comprises at least a first part 10, called a spacer, having a first face comprising an adhesive portion 101 intended to be glued onto the electronic board (not shown in FIG. 1b), and a second metal part 11 intended to be in contact with at least one electric circuit of the electronic board.

According to this embodiment, these two parts 10 and 11 are resistant to the temperatures used during the reflow step implemented to assemble the security dome 1 on an electronic board.

As already indicated, the materials chosen for these first and second parts 10, 11 must be compatible with the temperatures used during a reflow step, while ensuring the functions necessary for the use of a security dome, that is to say in particular the mechanical robustness and the dimensions required for such a dome. Indeed, these security elements are installed on electronic boards comprising a large number of components and at strategic locations on the board, sometimes requiring relatively small sizes of these security elements.

For example, the spacer 10 measures about 25 to 100 micrometres thick and has a cut shape allowing the metal part 11 to ensure an electrical contact with a circuit present on the electronic board.

In addition, this spacer 10 is made of a temperature-resistant material such as polyimides, liquid-crystal polymers, or (film) silicones. For the face 101, it is for example an adhesive material such as polyepoxides, polyimides, or acrylic. The choice of either one of these materials to obtain the desired technical effect, namely temperature resistance, can be dictated for example by considerations of cost, supply, manufacturing method.

The metal part 11 has a substantially circular shape, for example with a diameter of approximately 3 to 5 millimetres (more or less 0.03 millimetres), with a thickness of 1.18 millimetres (more or less 0.03 millimetres), and about 30 to 150 gram-force.

According to this embodiment, the security dome 1 also comprises a third protective part 12, having properties of resistance to the temperatures used during the reflow step and covering the first and second parts 10, 11. This third protective part 12 is for example in the form of a plastic film about 25 to 100 micrometres thick, with an at least partially adhesive face 121 intended to be glued to the first part 10 (on the face 102 opposite to the face 101), so as to form a housing for the metal part 11, while protecting it. In this second embodiment, the third protective part 12 is therefore not directly glued to the electronic board, but is glued to the spacer 10, which allows to form the dome so that it can be subsequently glued to an electronic board, as described below in relation to the assembly method.

In order to obtain the desired technical effects, namely the temperature resistance during one or more reflow steps, this third protective part 12 has features similar to the spacer 10 in that it is made of a temperature-resistant material such as Polyimides, Liquid Crystal Polymers, or (film) Silicones. The portion of the face 121 being made of an adhesive material such as polyepoxides, polyimides, or acrylic. Here again, the same selection criteria for either one of the aforementioned materials, or an equivalent material, lie in the optimisation of obtaining the desired technical effect. FIG. 1c illustrates an exploded top view of the example of security dome as described above in relation to FIG. 1b, the faces 101 of the spacer 10 and 121 of the third protective part 12 no longer being visible, the face 102 of the spacer being illustrated.

As already indicated, the proposed solution is based not only on security elements, or domes, having specific materials allowing to withstand the temperatures used during one or more reflow steps, but also on the integration of the implantation by gluing these domes in an automatic method for assembling components on an electronic board.

For this purpose, it is first necessary to recall the operation of a security dome: the periphery of the metal part of the dome rests on a conductive track on the electronic board, then, when the dome is constrained (for example when the two covers of an electronic payment terminal case are assembled), the central part of the metal part of the dome rests on another conductive track thus closing an electrical circuit. Therefore, when the constraint no longer applies to the dome (for example when the electronic payment terminal undergoes an opening attempt), the electrical circuit opens. This opening is detected then analysed for example as being representative of an intrusion into the device wherein the electronic board is integrated (for example an electronic payment terminal).

FIG. 2 illustrates part of an electronic board 20 before the assembly of electronic components, composed for example of a copper plate covering a substrate 21 (most often made of epoxy resin), this copper plate itself being even covered with varnish. FIG. 2 more particularly illustrates a location for the implantation of a security dome, this location being in particular materialised by a set of electrical tracks 22a, 22b, allowing the operation of the dome as described above. Thus, a central track 22a appears allowing the closing of the electrical circuit when the dome is constrained, thanks also to the other track 22b, on which the periphery of the dome (via its spacer 10 described above) rests.

In a second step, it is appropriate to describe the main steps of such an automatic assembly method, for example an SMD method, according to an embodiment of the present technique, in relation to FIG. 3.

The first step, which is conventional and known (not illustrated in FIG. 2), of such an automatic SMD assembly method consists in screen-printing the electronic board with solder paste, that is to say applying solder paste on predetermined ranges, intended to subsequently receive components to be welded. This screen-printing step is for example implemented using a metal stencil (called "foil"), allowing to cover only the locations of the component terminations with solder paste.

An automatic electronic component laying phase is then implemented, using a machine that picks up the components and places them in the predetermined locations ("Pick&Place"). Conventionally, the components that feed the laying machine are packaged in strips and are taken from this strip to be positioned on the board.

This automatic laying phase comprises not only obtaining and installing electronic components to be soldered, of the SMD type, but also, during a step E30, obtaining at least one security element, or dome, as previously described.

In an automatic SMD assembly application of an electronic board in an electronic payment terminal, the domes are deposited/glued onto a support (a reel, a film or a strip), from which they are removed by suction by the laying machine, during a step E30. The sampled domes are then positioned, by gluing (thanks to the adhesive face 101 of their spacers 10), at the predetermined locations on the electronic board, during a step E31.

At the end of this automatic laying phase, the components to be soldered are therefore laid in the dedicated locations (screen-printed beforehand with solder paste) and the security domes are glued to the dedicated locations. The gluing of the security domes is therefore fully automated as it is integrated into the automatic method for assembling electronic components on an electronic board.

Then, the electronic board is put in the oven, during at least one reflow soldering step E32, to solder the components. During this step E32, the temperature rises for example, according to a known temperature profile, up to a peak of 260° C. for a period of 5 to 6 minutes, so that the heat reflows the paste deposited during the screen-printing step to form the solder without the risk of overheating the electronic components. It is this temperature profile that the materials constituting the dome must withstand, as described above.

Conventionally, an automatic control step for inspecting the correct placement of the components is then implemented, as well as a step of electrically testing the electronic board.

Thus, the proposed technical solution allows to improve the assembly of the security domes on the electronic boards and consequently the manufacturing quality of the electronic payment terminals comprising such boards, thanks to a reproducible positioning on the board obtained by the automation of the method. In addition, the automation of this method also allows to obtain productivity gains. This technical solution is therefore easily transposable to a set of electronic payment terminals comprising electronic boards assembled in this way, and easily industrialisable. The proposed technical assembly solution therefore also increases the manufacturing quality of payment terminals while improving security. Indeed, by this gluing assembly method integrated into the automatic SMD method, the security domes, compatible with the temperatures used during the reflow steps thanks to the right choice of materials, are automatically placed on electronic boards, optimising the reliability of their positioning as well as their reliability in use.

The invention claimed is:

1. A security element, called a security dome, configured to be glued onto an electronic board, said security element comprising at least:
   a metal part configured to be in contact with at least one electrical circuit of said electronic board; and
   a protective part covering said metal part and having a first face comprising an adhesive portion to ensure the gluing of said security element on said electronic board by an automatic assembly method comprising at least one reflow step, said metal part and protective part being resistant to temperatures used during said reflow step.

2. The security element according to claim 1, wherein the security element also comprises a first part, called a spacer, having:
   a first face comprising an adhesive portion to be glued onto said electronic board by an automatic assembly method comprising at least one reflow step,
   a second face onto which said adhesive portion of said first face of said protective part is glued,
   said first part being resistant to the temperatures used during said reflow step.

3. The security element according to claim 1, wherein said first part has a hollow central portion and said metal part is movable relative to the first part and the protective part.

4. The security element according to claim 1, wherein the security element is composed of temperature-resistant materials belonging to the group consisting of:
   Polyimides;
   Liquid-crystal polymers;
   Silicones;
   Polyepoxides Acrylic.

5. An electronic board comprising at least one security element according to claim 1.

6. An electronic payment terminal comprising at least one electronic board according to claim 5.

7. A method for automatic assembling comprising the following automatic steps:
   obtaining at least one security element, called a security dome, said security element comprising at least:
      a metal part configured to be in contact with at least one electrical circuit of an electronic board; and
      a protective part covering said metal part and having a first face comprising an adhesive portion;
   positioning said at least one security element by gluing said adhesive portion of said first face of said protective part on said electronic board at a predetermined location;
   reflow soldering said electronic board, wherein said metal part and protective part are resistant to temperatures used during said reflow soldering.

8. The method for automatic assembling according to claim 7, further comprising, prior to said reflow soldering:
   screen-printing said electronic board; and
   placing electronic components to be soldered, and wherein the obtaining comprises removing, by suction, said at least one security element previously positioned on a support.

* * * * *